(12) United States Patent
Davies

(10) Patent No.: US 6,315,273 B1
(45) Date of Patent: Nov. 13, 2001

(54) GAS AND LIQUID CONTACT APPARATUS: ILLUMINATED

(76) Inventor: Lionel Davies, 155 The Mall, Leura, NSW (AU), 2780

( * ) Notice: Subject to any disclaimer, the term of this patent is extended or adjusted under 35 U.S.C. 154(b) by 0 days.

(21) Appl. No.: 09/571,858

(22) Filed: May 16, 2000

Related U.S. Application Data

(60) Provisional application No. 60/136,410, filed on May 27, 1999.

(51) Int. Cl.⁷ ........................................................ B01F 3/04
(52) U.S. Cl. ................................ 261/29; 261/77; 261/126
(58) Field of Search ............................ 261/29, 36.1, 77, 261/121.1, 126

(56) References Cited

U.S. PATENT DOCUMENTS

| | | | |
|---|---|---|---|
| 1,574,783 | * | 3/1926 | Beth ........................................ 261/77 |
| 1,917,577 | * | 7/1933 | Doble, Jr. ................................ 261/29 |
| 2,854,002 | * | 9/1958 | De Wall et al. ...................... 261/121.1 |
| 3,206,176 | * | 9/1965 | Peterson ................................. 261/29 |
| 3,562,349 | * | 2/1971 | Pawloski et al. ..................... 261/36.1 |
| 4,246,890 | * | 1/1981 | Kraus et al. ........................ 261/121.1 |
| 4,569,804 | * | 2/1986 | Murphy ................................. 261/77 |

* cited by examiner

Primary Examiner—C. Scott Bushey

(57) ABSTRACT

A gas and liquid contacting apparatus, illuminated, with circulation, and a method, are disclosed. To remove a trace component from a mixture of gases, for example to remove carbon dioxide from air, the inefficiency of attempting to dissolve all of the gas mixture followed by desorption of the non target components is overcome by injecting small bubbles (5) into a liquid filled chamber (1) which is inclined at an angle and has an abrupt change in cross section (2) & (3). The target component diffuses out of the small bubbles. The small bubbles, substantially relieved of the target component, are collected in a gas trap (4) created by the inclination and dimension change of the chamber. Large bubbles (8) escaping from the gas trap via an upper riser (9) to a reservoir (10) assist with the circulation of the contents of the system. A return tube (11) connecting the reservoir to the bottom end of the chamber completes the circuit. A low pressure low energy smooth circulation system is described suitable for removing a greater quantity of a target component than is created by the energy inputs. Parts of the system are made of material transparent to required energy sources. Variations are disclosed.

8 Claims, 2 Drawing Sheets

GAS AND LIQUID CONTACT APPARATUS: ILLUMINATED

CROSS REFERENCE TO RELATED APPLICATIONS

This application claims benefit under 35 USC 119(e) of Previous Provisional Application in U.S.:—No. 60/136,410 May 27th, 1999, now abandoned.

Previous Provisional Applications in Australia:—PP0646 December 1997, PP2070 March 1998, PP7452 December 1998

STATEMENT REGARDING FEDERALLY FUNDED RESEARCH OR DEVEL

Not Applicable

REFERENCE TO A MICROFICHE APPENDIX

Not Applicable

BACKGROUND OF THE INVENTION

This invention relates generally to improvements in method and apparatus for circulating fluids by gas injection and illuminating the mixture and relates particularly to the extraction of a component of the gas, for example the extraction of carbon dioxide from air, and converting the extracted component into a useful product without creating more of the component than is extracted.

For many people a need has arisen to lower and/or control the amount of carbon dioxide in the biosphere. At this time in history such a need may not be proven but it would be perhaps unwise to ignore the situation. Other long term habitats such as undersea vessels and space stations benefit from carbon dioxide control.

The manipulation of other substances such as carbon monoxide and sulphur dioxide and the manipulation of liquid and solid particulate material is envisaged.

It is perhaps worth noting here that the following terms have been used in patents and in the industry generally:—reaction vessel, processing tank, fermenter, photoreactor, biophotoreactor, biophotolysis, photometabolic, flow through reactor, transparent, translucent, circulating liquids and contacting with a gas, perfusion apparatus, air lift, riser, traverser, downcomer, side arm, side tube, external loop and more.

This inventor invented the word themma to give the present invention a name but this inventor is having some problems registering themma as a Trade Mark in various parts of the world.

The term reactor seems to have come into general use.

Illumination is a term used in the title of the present invention, but if it can be seen it is illuminated and if parts of a system are transparent then the contents will be illuminated. Some molecules are very sensitive to illumination. Some molecules absorb at one wavelength and emit at another. Some materials absorb energy of one type and emit another type.

For the purpose of describing the present invention the term illumination preferably includes:—the electromagnetic spectrum, photons, laser beams, electrostatic fields, magnetic fields, sound waves, irradiation (which is apparently ultra violet radiation), wave energy, direct currents, alternating currents, nuclear radiation, subatomic particles, atomic particles and particles larger than atomic ones.

There have been many proposals to contact gases with liquids but these have mainly been high pressure high energy input devices designed to absorb oxygen. For example one previous device (Australian Patent No. 69,062/74) proposes injection of air at an oxygen transfer rate of sixteen kilograms per hour per cubic metre with a power transfer ratio of one point nine kilograms per kilowatt hour, into the base of a fermenter eighty metres tall.

There have been many proposals to illuminate reactors but none of these have taken energy and/or, say, carbon dioxide input/output into main consideration. For example one previous device (U.S. Pat. No. 4,010,076) proposes illumination of algae to produce NADPH and proposes illumination of bacteria to produce molecular hydrogen, nanogram quantities in ninety minutes under fourteen 100 watt lamps, neither situation involving a reagent gas. All of the above proposals have the disadvantage that a gas, such as carbon dioxide in air, cannot be utilized in an efficient, economical and environmentally sensitive manner.

BRIEF SUMMARY OF THE INVENTION

These problems are overcome by the present invention which provides a means for contacting a gas and a liquid and illuminating and circulating the resultant fluid mixture whereby small bubbles of gas under low pressure are injected into a chamber filled with liquid and the small gas bubbles collect at the top end of the chamber because the chamber is inclined at an angle and has a significant change in dimension, these two together creating a gas trap. Gas escapes from the gas trap at the top of the chamber, predominantly in bubbles larger than the injected bubbles, via an upper riser then via a reservoir to the atmosphere or to a recovery system. The reservoir is connected to the lower end of the chamber by a return tube thus creating a loop for the contents of the system which are transported around the loop by the phenomenon of gas injection. Appropriate parts of the system are illuminated as required, all of the foregoing assisting in creating a low energy low pollution means of extraction of a component without creating more of the component than is extracted.

Further advantages, features and objects of the present invention will become apparent by reference to the following detailed description when considered in connection with the accompanying drawings.

BRIEF DESCRIPTION OF THE SEVERAL VIEWS OF THE DRAWING

NOTE:—FIG. 3 & FIG. 4

Figure 1:
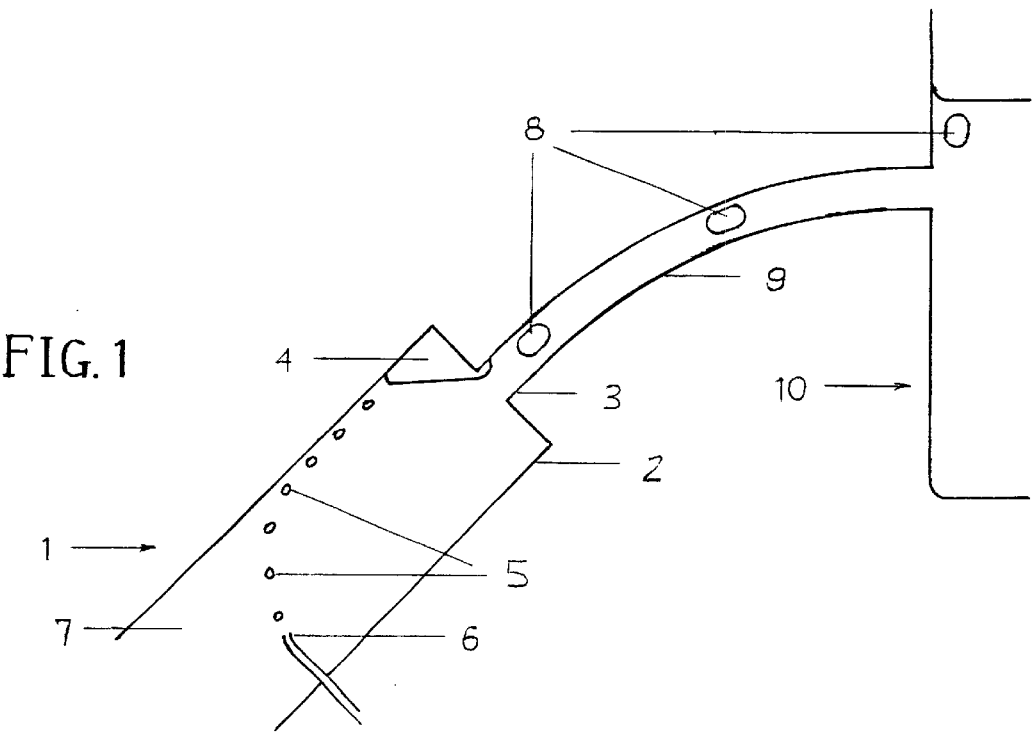
FIG. 1 is a cross sectional side elevation of the upper end of the chamber, the gas trap created therein, the upper riser, the gas bubbles, and part of the reservoir. Only one gas injection point is shown for the sake of clarity.

\# the tube carrying the gas, from the gas pump (13) to the injection area (6), is slightly out of proportion; it should be smaller in diameter; about the same size as the overflow (15) or the vents (12) & (17), \# the almost a circle (6) in the injection area is meant to represent an aeration stone, spherical, supplied at purchase with the gas pump.

DETAILED DESCRIPTION OF THE INVENTION

Referring to FIG. 1, in accordance with the invention, a chamber 1 containing a liquid 7 has an injection point 6 for gas. The chamber 1 is inclined at an angle and has an abrupt change in dimension at the upper end from wide 2 to narrow 3 creating a gas trap 4 therein. Small gas bubbles 5 emitting from the injection point 6 collect in the gas trap 4. Larger bubbles 8 emit from the gas trap 4 via an upper riser 9 to a reservoir 10. FIG. 1, being on an enlarged scale, does not show the lower end of the chamber 1.

Figure 2:
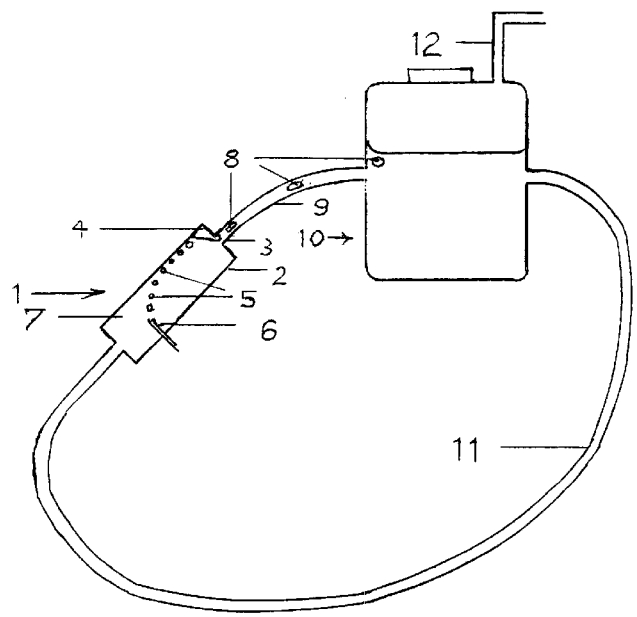
FIG. 2 is a cross sectional side elevation of the chamber, the reservoir, and the circuit created by the connections therebetween. Only one gas injection point is shown for the sake of clarity.

FIG. 2, being on a smaller scale than FIG. 1, shows the complete chamber 1 the lower end of which is connected from the reservoir 10 by a return tube 11 thereby creating a circuit. The gas and the liquid are thus in contact at the interface of the small bubbles, at the interface of the gas trap and at the interface of the large bubbles.

The contents of the circuit flow because of the pressure difference between the position of a gas bubble and an equivalent horizontal position in the return tube 11. The principle of circulating a liquid by pressure differential caused by gas bubbles is well established (U.S. Pat. No. 3,847,748 if not U.S. Pat. No. 3,468,057 if not U.S. Pat. No. 1,574,783). The kinetic energy of the injected gas and the direction of injection also contribute to the flow of the contents of the circuit. The direction of flow (not shown by arrows in the drawing) is, in the drawing, clockwise, that is from the chamber 1 up through the upper riser 9 across the reservoir 10 through the return tube 11 into the lower end of the chamber 1. The use of numerous right angle bends, as in previous art, is avoided. The use of smooth curvilinear pathways in the present invention represents a significant improvement in efficiency over and above the already mentioned injection of small bubbles 5 into a low pressure region of a chamber 1 which is inclined at an angle and has an abrupt dimension change from 2 to 3.

Fluid mixture is a frequently used phrase to describe the contents of the circulating components. Before startup the system is filled to the appropriate level with the appropriate liquid 7. At startup small bubbles 5 begin to accumulate in the gas trap 4 until the trap can contain no more gas whence bubbles 8, preferably larger than the injected bubbles 5, escape the chamber 1. After startup a continuous stream of small bubbles creates a continuous stream of large bubbles. A small proportion of small bubbles inevitably bypass the gas trap. Other gas bubbles generated by a reaction within the system, for example oxygen generated by a photosynthesis type reaction, may appear at any point. To describe the circulating contents as a fluid mixture is perhaps not a misnomer but it should be realised that the composition of the circulating contents changes from point to point around the dynamic system.

Inevitably there will be some turbulence, particularly in the region of the gas injection point 6, however the flow is substantially from the bottom to the top of the chamber 1 thence around the circuit.

The return tube 11 conveys contents from the reservoir 10 at first horizontally then vertically downward then horizontally then up and around toward the axis of inclination of the chamber 1, all in as smooth a curve as possible. The use of terms such as downcomer, traverser and riser are avoided when referring to the return tube 11.

The upper riser 9, also in as smooth as possible a curve, conveys contents from the axis of inclination of the chamber 1 toward the somewhat horizontal entry of the reservoir 10.

Batchwise or continuous methods are possible, although continuous methods will necessarily require shutdown for routine maintenance.

The chamber 1, the reservoir 10, the upper riser 9, and parts of the return tube 11, all being in a low pressure region may be constructed of lightweight materials. Indeed where transparency is required, such parts as necessary may be constructed extremely thin of substances such as glass, synthetic polymer or biological material. The benefit of high transmission should be apparent to those skilled in the art. There is an added advantage in being able to observe proceedings. Reflectors (not shown in the drawing) may be added as required. Indeed the concept of enclosing an entire transparent part with reflective material, such as wrapping the chamber 1 with foil, leaving only a small hole for the admission of an energy source such as a light bulb, an optical fiber or a laser beam, is not precluded. The use of thin materials in the present invention is also an improvement over previous art. Turbulence caused by gas bubbles is a significant factor in the determination of the strength of construction of relevant parts.

Higher pressure regions, for example at the bottom of the loop of the return tube 11, must of course be constructed of suitable materials. If and when higher pressure is required the distance to which the return tube 11 may be extended vertically below the level of the liquid in the reservoir seems to be governed mainly by friction losses.

Flexibility of the return tube 11 and of the upper riser 9 allow for ease of adjustment of the angle of inclination of the chamber 1. The said flexibility also enables the chamber 1 to be raised above the general level of the liquid facilitating maintenance, such as cleaning of gas injection jets, without the need to remove any liquid.

Figure 3:
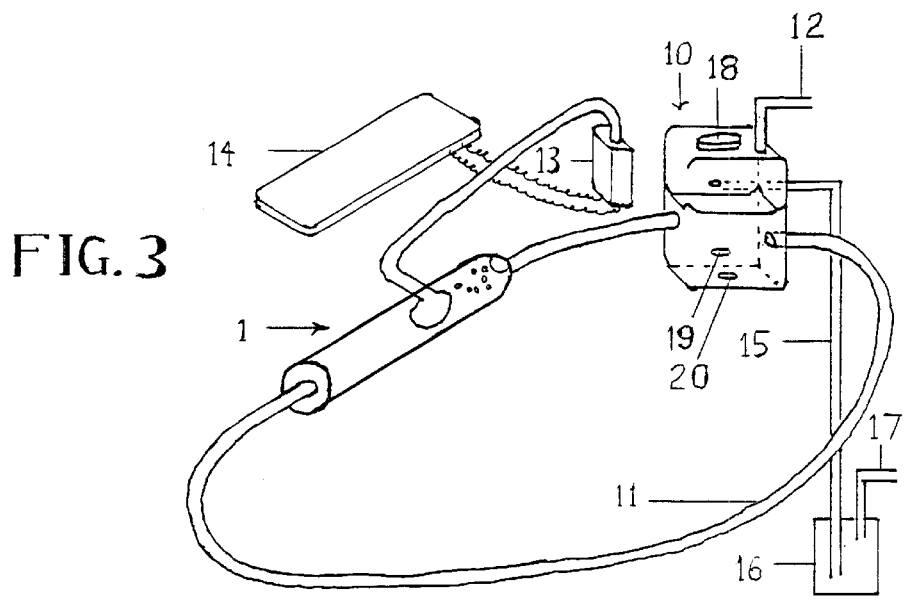
FIG. 3 is a perspective view of the system complete with other parts necessary for the operation of the invention.

Other parts necessary for the operation of the invention are shown in FIG. 3 where a gas pump 13 is driven by an energy source 14. An overflow 15 enabling removal of any immiscible liquid from the surface of the reservoir 10 terminates in a collector 16. Vents 12 and 17 attached to the reservoir 10 and the collector 16 respectively, enable removal and recovery of gases and vapours for further processing as required. The reservoir 10 has a lid 18 a side drain 19 and a bottom drain 20 each allowing addition or removal of solids and/or liquids.

Figure 4:
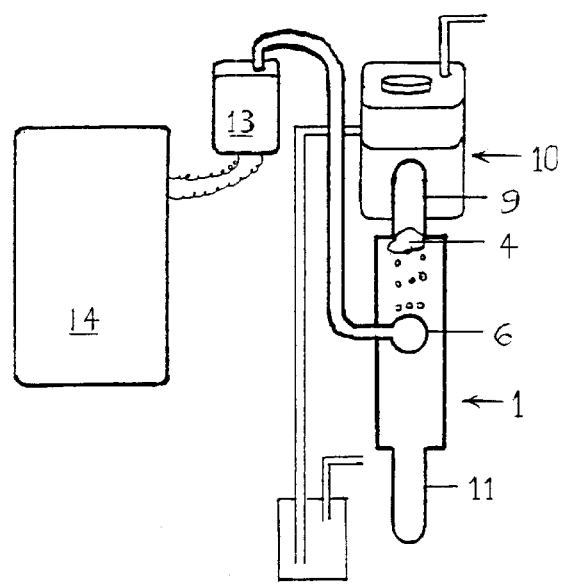
FIG. 4 is a view from above(ish), perpendicular to the angle of inclination of the chamber, of the system of FIG. 3.

FIG. 4 has been included to show the view from a position somewhat above the system, at right angles to the angle of inclination of the chamber 1. FIGS. 2,3 and 4 are on approximately the same scale.

For increased efficiency in some operations the chamber 1 may be inclined at angles to the x, y and or z axes or planes, that is almost any position in space.

EXAMPLE 1

In one actually constructed model the chamber 1 is an irrigation filter, with the cartridge removed, about six inches long and one inch in diameter with an inlet and an outlet each of about one half inch diameter, purchased from a local hardware store. The reservoir 10 is a three liter container, sold as suitable for storing drinking requirements in a domestic refrigerator, purchased from a local supermarket; some extra holes were needed in same. The gas pump 13 was purchased from a pet supply shop where the usual pumps are for aeration of domestic aquaria, however in this case the pump 13 is also suitable for minnow bucket aeration, that is for keeping small bait fish alive, and can be powered from a 12 volt source such as a vehicle cigar lighter or indeed one D cell at 1.5 volt. In the model actually constructed the energy source is a solar panel:—Solarex of U.S.A. Type SA1, 1.4 watts. In at least one trial the upper riser 9 and the return tube 11 were cut from petrol (gasoline) resistant polymer tubing, one half inch diameter, purchased from the local hardware store. The reservoir 10 sits on, say, a stool about two feet high and the bottom part of the loop of the return tube 11 rests on the ground. The gas pump is positioned above liquid level to prevent backflow through it during shutdown.

EXAMPLE 2

Using the apparatus of Example 1 a green aquatic plant was anchored in the transparent reservoir 10, the liquid phase 7 was Blue Mountains near Sydney Australia tap water, and the system placed outdoors. Within a few weeks the green plant, which had visibly increased in size, was hung up to dry then placed in a container marked Carbon Dioxide Sink.

It is well to note here that the chamber 10, that is the water filter with the cartridge removed, is available in two forms, a transparent (apparently polycarbonate) walled type and an opaque black polyethylene walled type. The manufacturers prefer the customer to purchase the opaque type in that the transparent model tends to clog with algae under normal operating conditions. The use of an illuminated chamber to expose circulating or stabilised autotrophic systems is not precluded.

Gains in efficiency by the use of specific energy for the illumination process, such as collecting solar energy then re-emitting such energy at specific wavelengths, are not precluded.

Heat exchange, to remove heat, may be required in some circumstances. If there is excessive heat then there should be sufficient energy to operate a refrigeration plant.

As can be seen from the above descriptions the apparatus and the method are particularly suitable for removing carbon dioxide from air. The application toward removal of other components such as nitrogen, oxygen, methane, halogenated hydrocarbons, oxides of nitrogen and others should be apparent to those skilled in the art.

The fact that the parts for the system are readily available in large numbers is of consequence.

When illuminated the present invention seems to fall within U.S. Pat. No. Class 435/292.1, which is a biochemistry area. The non-biochemical Class seems to be 204/157.15. If not illuminated then there is Class 261 to consider.

Groundwater containing low carbon dioxide on being fed batchwise or continuously into the present invention may leave the system with more carbon dioxide than it had when entering because of the surface area considerations of small bubbles, albeit at low pressure, compared to large bubbles at even lower pressure, this being an instance of illumination not being necessary.

Chlorinated water may be dechlorinated by simply operating the invention for an appropriate period, this being an example of extraction of a target component from the liquid rather than from the injected gas. The dechlorinated water may be required per se such as for drinking water for people who find the presence of chlorine unpalatable. With biochemical type applications for the invention it is advisable to remove substances such as chlorine, by pre-running the system, before introducing species susceptible to such subsances.

The inclination of the chamber produces an added advantage in that small bubbles are slowed in progress as they move along the sloping upper wall, allowing more time for the target component to diffuse out of the small bubbles into the liquid.

The energy source for the invention need not be solar as in the quoted examples. If carbon dioxide is the target component to be controlled then energy sources such as wind, tidal, hydro or nuclear would be suitable.

Although the invention has been described in conjunction with specific embodiments, many alternatives and variations will be apparent to those skilled in the art. Accordingly, the invention is intended to embrace all of the alternatives and variations that fall within the spirit and scope of the appended claims.

I claim:

1. A method for contacting a liquid and a gas and illuminating and circulating the resultant fluid mixture, comprising the steps of:

injection of small bubbles of gas at low pressure into a liquid filled chamber, the chamber being inclined at an angle and having an abrupt change in dimension at the upper end thereby creating a gas trap inducing agglomeration of small bubbles and the upper and lower ends of the chamber being connected separately by smooth curvilinear tubing to a reservoir of liquid thereby achieving a circuit and allowing large bubbles to emit from the gas trap into the reservoir via the upper riser tubing, the said large bubbles assisting the small bubbles in circulating the contents of the system and the chamber and any part of the system being illuminated wholly partly or not at all on a full or part time basis, and all in combination assisting removal of at least one target component.

2. The method of claim 1 wherein the injected gas is air.

3. The method of claim 1 wherein the injected gas is an exhaust gas.

4. Apparatus for contacting a liquid with a gas and circulating and illuminating the resultant fluid mixture, comprising the elements of:

a chamber having at least one means of injecting small bubbles of gas into a liquid contained therein and having an inclination and an abrupt change in dimension at the upper end creating a gas trap where small bubbles agglomerate and having an inlet at the lower end and an outlet at the upper end each connected separately to a reservoir of liquid thereby creating a loop for the circulating contents and allowing large bubbles to emit from the gas trap via the upper riser into the reservoir and the said chamber and any part of the apparatus being illuminated wholly partly or not at all on a full or part time basis and all in combination assisting removal of at least one target component.

5. Apparatus of claim 4 wherein the shape of the chamber is, in any cross section, circular or square or rectangular or ellipsoidal or irregular.

6. Apparatus of claim 5 wherein more than one chamber is connected to a single reservoir.

7. The method of claim 2 wherein the target component of the injected gas is carbon dioxide.

8. The method of claim 3 wherein the target component of the injected gas is carbon dioxide.

* * * * *